(12) United States Patent
Zhang et al.

(10) Patent No.: US 11,044,477 B2
(45) Date of Patent: Jun. 22, 2021

(54) MOTION ADAPTIVE ENCODING OF VIDEO

(71) Applicant: INTEL CORPORATION, Santa Clara, CA (US)

(72) Inventors: Ximin Zhang, San Jose, CA (US); Szu-Wei Lee, Fremont, CA (US); Sang-Hee Lee, San Jose, CA (US); Keith Rowe, Shingle Springs, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/715,315

(22) Filed: Dec. 16, 2019

(65) Prior Publication Data

US 2020/0120342 A1 Apr. 16, 2020

(51) Int. Cl.
*H04N 19/124* (2014.01)
*H04N 19/12* (2014.01)
*H04N 19/172* (2014.01)
*H04N 19/517* (2014.01)

(52) U.S. Cl.
CPC ........... *H04N 19/124* (2014.11); *H04N 19/12* (2014.11); *H04N 19/172* (2014.11); *H04N 19/517* (2014.11)

(58) Field of Classification Search
CPC .... H04N 19/58; H04N 19/139; H04N 19/423; H04N 19/463; H04N 19/157; H04N 19/527
See application file for complete search history.

(56) References Cited

U.S. PATENT DOCUMENTS

| | | | | |
|---|---|---|---|---|
| 7,436,887 | B2 * | 10/2008 | Yeredor | G06K 9/00771 375/240.01 |
| 8,265,145 | B1 * | 9/2012 | Pejhan | H04N 19/156 375/240.11 |
| 2003/0215011 | A1 * | 11/2003 | Wang | H04N 19/40 375/240.03 |
| 2004/0190614 | A1 * | 9/2004 | Schlockermann | H04N 19/91 375/240.12 |
| 2006/0088094 | A1 * | 4/2006 | Cieplinski | H04N 19/124 375/240.01 |
| 2006/0227862 | A1 * | 10/2006 | Campbell | G06T 7/254 375/240 |
| 2007/0199011 | A1 * | 8/2007 | Zhang | H04N 19/124 725/1 |
| 2009/0262804 | A1 * | 10/2009 | Pandit | H04N 19/46 375/240.12 |

(Continued)

Primary Examiner — Daniel Chang
(74) Attorney, Agent, or Firm — Hanley, Flight & Zimmerman, LLC (57) ABSTRACT

An example apparatus for encoding video frames includes a receiver to receive a current frame to be encoded, and a quantization parameter and statistics for the current frame. The apparatus also includes a frame motion analyzer to detect a motion activity status for the current frame based on the statistics via a motion activity analysis. The apparatus further includes a motion adaptive frame inserter to adaptively switch between a regular reference list management and a long-term reference frame insertion based on the detected motion activity status and the quantization parameter. The apparatus also further includes an encoder to encode the current frame using the regular reference list management or the long-term reference frame insertion.

22 Claims, 5 Drawing Sheets

(56) References Cited

U.S. PATENT DOCUMENTS

| | | | |
|---|---|---|---|
| 2011/0249729 A1* | 10/2011 | Zhou | H04N 19/89 |
| | | | 375/240.07 |
| 2013/0003845 A1* | 1/2013 | Zhou | H04N 19/61 |
| | | | 375/240.16 |
| 2017/0214938 A1* | 7/2017 | Zhang | H04N 19/142 |
| 2020/0120344 A1* | 4/2020 | Mao | H04N 19/58 |

* cited by examiner

(12) United States Patent

MOTION ADAPTIVE ENCODING OF VIDEO

BACKGROUND

Video codecs are used to efficiently encode videos for transfer between devices or playback on devices with particular playback support. For example, one such codec is the H.264/AVC codec standard.

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

The Advanced Video Coding (H.264/AVC) codec standard, latest version 26 Edition 13 released June 2019, includes various features for compression efficiency. For example, the spatial direct and skip modes are used to significantly improve compression efficiency for B frames. As used herein, a B frame refers to a frame that can use a preceding frame and a subsequent frame as the prediction reference. Spatial direct modes exploit spatial correlation by deriving motion vectors from previously encoded information for macroblocks in the same frame. Each motion vector may point to the position of the matching block at the reference frame. As used herein, a reference frame refers to a previously encoded frame used as a reference for a current frame to be encoded. In particular, motion vectors of a direct macroblock or block may be derived from previously encoded information such as motion vectors in other macroblocks. For example, in spatial direct mode, a motion vector for a macroblock may be derived from motion vectors of spatially adjacent blocks. For example, the spatial predictor may be the median of three previously coded motion vectors from the left of the block, above the block, and a diagonal above-right block or diagonal above-left block. The spatial direct modes include a B_Direct_16×16 and a B_Direct_8×8 mode that use 16×16 partitions and 8×8 partitions and spatial predictors as the motion vector for prediction. The direct mode can thus be specified for finer partitions of 8×8 blocks. The skip modes include a B_skip mode that indicates that motion vectors of the predictor are to be used entirely to encode a block with no coefficient bits. With each of these spatial modes, the motion vectors of the block may first be derived from the motion vectors of its spatially adjacent blocks. The final selected predictor is the median of the three previous coded motion vectors from the left (block 'A'), the above (block 'B'), and the above-right blocks (block 'C', or the above-left block (block 'D') when the motion vector of the above-right block unavailable.

Then, the spatial direct and skip modes may also exploit the temporal redundancy by considering whether each block is stationary or not according to the motion vector of its co-located block. As used herein, a co-located block refers to a block in another frame located at the same position in the frame. If the co-located block is stationary, the motion vectors of spatial direct and skip modes are set equal to zero via motion vector zero-enforcing. For example, if the co-located block is in reference picture list Ref PicList1, which may be marked as used for short-term reference, and both motion vector components mvCol[0] and mvCol[1] lie in the range of −1 and 1, then both components of the motion vector mvLX may be set equal to 0. For example, mvCol[0] may be a horizontal axis and mvCol[1] may be a vertical axis, and a value of 1 may refer to a quarter of a pixel. In this way, bits may be saved and acceptable compression achieved for sequences with big percentage of static areas. However, for the clips with universal or global motion activities, this approach may deteriorate in compression efficiency, especially for low bit rate coding that uses high quantization parameter (QP) values. As used herein, a QP value indicates an amount of quantization to be applied to a particular macroblock at encoding. The QP value thus regulates how much spatial detail is saved. When QP is very small, almost all detail is retained. As QP is increased, some detail is aggregated such that the bit rate drops at the cost of some increase in distortion and some loss of quality. For example, in H.264 the QP value ranges from 0 to 51.

The present disclosure relates generally to techniques for motion adaptive video encoding. Specifically, the techniques described herein include an apparatus, method and system for encoding video frames using motion adaptive video encoding. An example apparatus includes a receiver to receive a current frame to be encoded, and a quantization parameter and statistics for the current frame. The apparatus also includes a frame motion analyzer to detect a motion activity status for the current frame based on the statistics via a motion activity analysis. The apparatus further includes a motion adaptive frame inserter to adaptively switch between a regular reference list management and a long-term reference frame insertion based on the detected motion activity status and the quantization parameter. As used herein, long-term frames are frames that are stored in a long term reference list and can be used as reference for a longer period of consecutive frames than short-term reference frames. Long-term frames may usually exceed a threshold quality within a temporal window from a current frame. For example, long-term reference frames may be used as reference frames during relatively static video content, in which many frames may be encoded based on the long-term reference. Short-term frames are frames that are closer to a current frame than long-term reference frames. For example, the frame immediately prior to a current frame being process may typically be found in a short-term reference list. During the encoding process, a greater number of short-term reference frames may be used and thus temporarily stored for processing than long-term reference frames. As one example, up to 16 short-term reference frames may be stored, while only two long-term reference frames may be stored for encoding a current frame. Thus, regular reference list management may involve the use of most frames in a reference picture list as short-term references, with some of the references sometimes being used as long-term references. A long-term reference frame insertion, as used herein, refers to a setting of all frames in a reference picture list as long-term references. The apparatus also further includes an encoder to encode the current frame using the regular reference list management or the long-term reference frame insertion.

The techniques described herein thus enable motion vector zero-enforcing to be avoided for the frames with global motion and/or universal motion activity, and only be applied as necessary. As used herein, global motion refers to the same motion of all content within a scene. For example, a global motion may be the movement of all macroblocks in a frame by the same direction and magnitude. As one example, global motion can be caused by a panning of a camera. As used herein, universal motion refers to motion present across the whole of each frame, but the macroblocks of each frame may have motion vectors with different directions and magnitudes. For example, a scene including a close-up of leaves of a tree in a windy situation may include lots of motion that fills a frame, but the motion of the leaves may be in different directions and magnitudes. In this example, the motion may not be global motion because the motion across the frames is not uniform. The techniques described herein can thus adaptively set long-term reference frames or short-term reference frames such that the spatial direct and skip coded block can adaptively enable or disable motion vector zero-enforcing based on the contents and actual encoding conditions of each frame. Compared to other solutions, preliminary tests on H.264/AVC have shown that the techniques described herein can achieve up to 4.6% average Bjontegaard delta (BD) bitrate gain and up to 0.9 db gain for individual frames on test clips with global motion. Thus, the techniques described herein may be used to improve compression across a greater range of video contents. In addition, the techniques may be used to improve compression across a greater variety of QP values. In particular, the compression of frames with higher QP values may be improved using techniques used herein.

Figure 1:
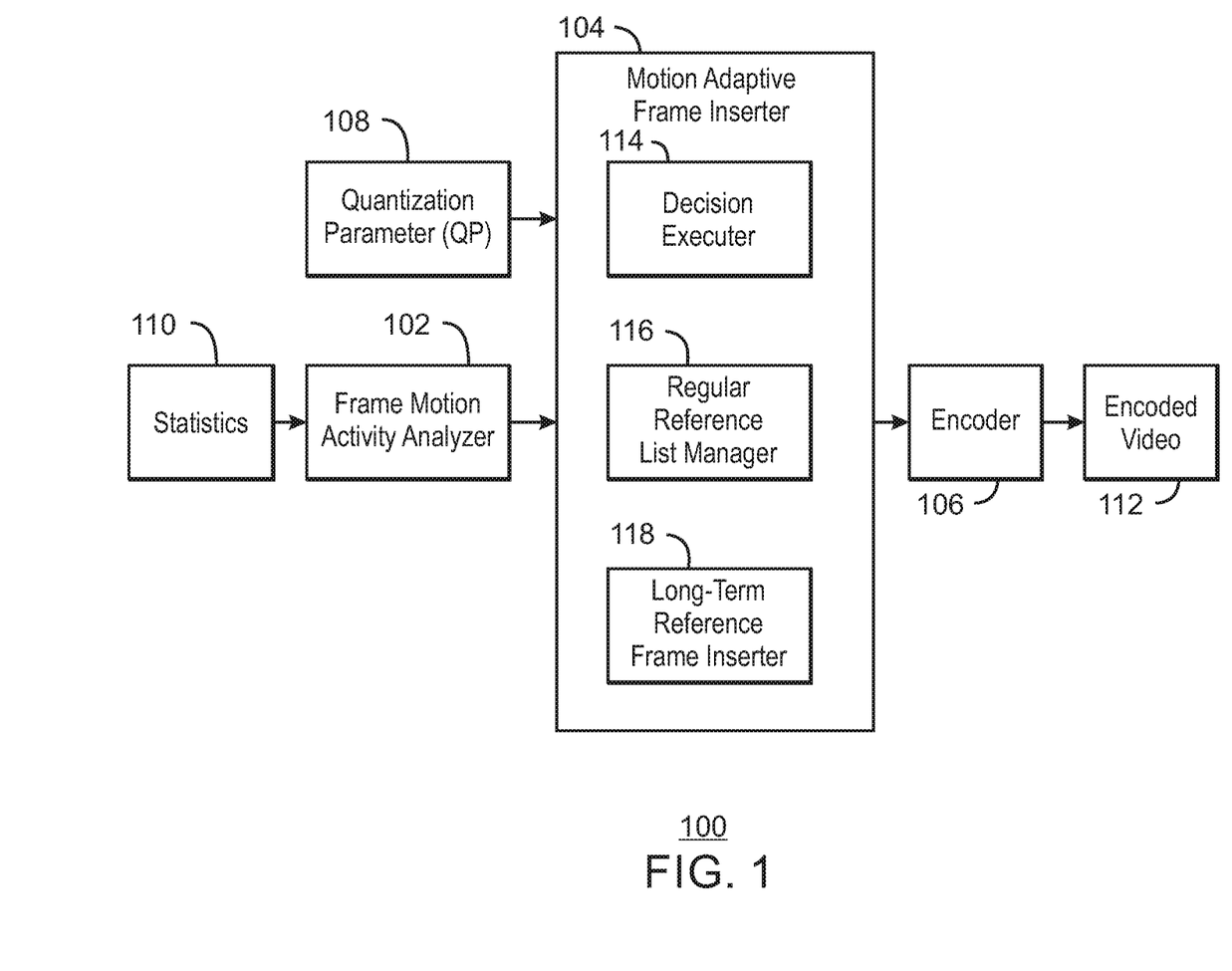
FIG. 1 is a block diagram illustrating an example system for motion adaptive encoding of video.

FIG. 1 is a block diagram illustrating an example system for motion adaptive encoding of video. The example system 100 can be implemented in the computing device 400 in FIG. 4 using the methods 200 or 300 of FIGS. 2 and 3.

The example system 100 includes a frame motion activity analyzer 102. The system 100 also includes a motion adaptive frame inserter 104 communicatively coupled to the frame motion activity analyzer 102. The system 100 also further includes an encoder 106 communicatively coupled to the motion adaptive frame inserter 104. The motion adaptive frame inserter 104 is shown receiving a quantization parameter (QP) 108. The frame motion activity analyzer 102 is shown receiving statistics 110. The encoder is shown outputting an encoded video 112. The motion adaptive frame inserter 104 includes a decision executer 114. The motion adaptive frame inserter 104 also further includes a regular reference list manager 116 and a long-term reference frame inserter 118.

As shown in FIG. 1, the system 100 can receive a QP 108 and statistics 110 and generates encoded video 112. In particular, the frame motion activity analyzer 102 can analyze the statistics 110 to determine motion activity status for a current frame. For example, the frame motion activity analyzer 102 can detect that a frame is a static frame based on the statistics. As one example, the frame motion activity analyzer 102 can detect that a frame is a static frame in response to determining that at least a predetermined number of regions contain a number of macroblocks using a zero motion vector that exceeds a first picture resolution adaptive threshold. In some examples, the frame motion activity analyzer 102 can detect that the frame includes global motion. For example, the frame motion activity analyzer 102 can detect that the frame includes global motion in response to determining that a majority of blocks or key points have a similar motion. In various examples, the frame motion activity analyzer 102 can detect that a frame includes universal motion. For example, the frame motion activity analyzer 102 can detect that a frame includes universal motion in response to detecting that the total number of macroblocks that use zero motion vector for each region for all of the regions do not exceed a second picture resolution adaptive threshold.

In some examples, the motion activity analysis can include a look ahead analysis before the actual encoding is started or on each reference frame before the encoding of the B frames. For example, look ahead analysis may be used in non-real-time applications. In various examples, if motion activity analysis finds that there is big enough static background or that the encoding quantization parameter is less than a first threshold, then regular short-term reference list management is applied. A normal zero-enforcing may then be applied to the spatial direct and skip mode motion vectors if the co-located reference block is stationary. Otherwise, if a global motion is detected, a long-term reference frame insertion is applied such that all the reference frames in the RefPicList1 are set as long-term. In doing so, the "used for short-term reference" condition is not satisfied, and thus zero-enforcing may be avoided for the spatial direct and skip mode motion vectors even if the co-located reference block is detected as stationary.

If none of the above two conditions are satisfied, the frame motion activity analyzer 102 can check for a universal motion activity. In various examples, if there is universal motion activity detected and the encoding quantization parameter is larger than a second threshold, long-term reference frame insertion is applied by the long-term reference frame inserter 118. For example, long-term reference frame insertion may include setting all the reference frames in a reference picture list RefPicList1 as long-term. In setting all the reference frames in a reference picture list RefPicList1 as long-term, the "used for short-term reference" condition is not satisfied, and thus zero-enforcing is avoided for the spatial direct and skip mode motion vectors even if a co-located reference block is detected as stationary. Otherwise, the regular short-term reference list management is applied, and normal zero-enforcing is applied to the spatial direct and skip mode motion vectors if the co-located reference block is stationary.

The regular reference list manager 116 can execute a regular reference list management. For example, regular reference list management may include applying normal zero-enforcing. In various examples, normal zero-enforcing may be applied to the spatial direct and skip mode motion vectors if the co-located reference block is stationary.

The long-term reference frame inserter 118 can execute a long-term reference frame insertion. For example, the long-term reference frame inserter 118 can avoid zero-enforcing for spatial direct and skip mode motion vectors even if a co-located reference block is detected as stationary.

As one example, if a look ahead analysis is enabled, the input pictures may be down-sampled and encoded with constant QPs. For example, a video stored on a computer may converted into a more compressed copy. Each picture of the video is evenly divided into 9 regions and the total number of macroblocks that use zero motion vector for each region are calculated as Z1, Z2 . . . Z9. These nine values Z1~Z9 are compared to the first picture resolution adaptive threshold. If any two of the values are larger than the threshold, the picture is detected as picture with big enough static background. Otherwise, these nine values Z1~Z9 are compared to a second picture resolution adaptive threshold. If all of them are less than the second threshold, the picture is detected as picture with universal motion activity.

As another example, if no look ahead analysis is used, the motion vectors statistics of the just encoded reference frame may be used. For example, no look ahead analysis may be used due to real-time streaming limitations. As contrasted with the previous example above, a macroblock may be counted only if the macroblock has zero motion vector and one of its eight neighbors has zero motion vector. In various examples, the obtained nine values Z1~Z9 may be compared to a third picture resolution adaptive threshold. If any two of the nine values are larger than the third picture resolution adaptive threshold, the picture is detected as picture with big enough static background. Otherwise, these nine values Z1~Z9 are compared to the fourth picture resolution adaptive threshold. If all of the values are less than the fourth picture resolution adaptive threshold, the picture is detected as a picture with universal motion activity.

The diagram of FIG. 1 is not intended to indicate that the example system 100 is to include all of the components shown in FIG. 1. Rather, the example system 100 can be implemented using fewer or additional components not illustrated in FIG. 1 (e.g., additional statistics, QPs, encoders, etc.).

Figure 2:
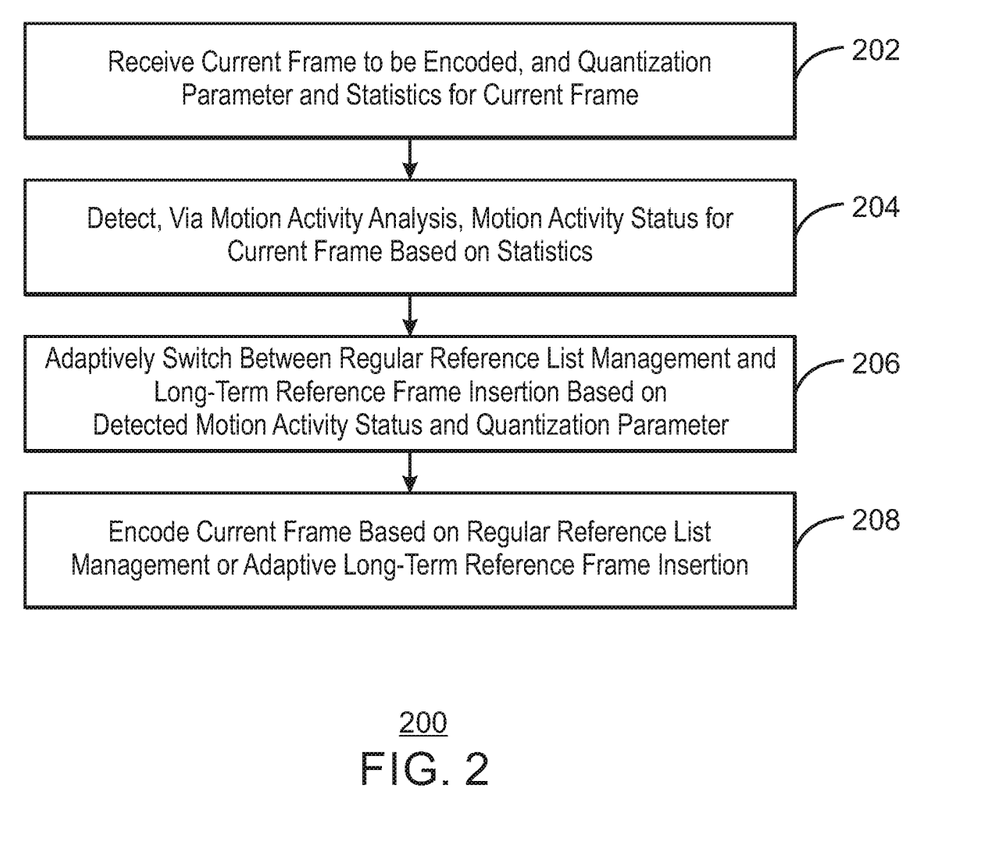
FIG. 2 is a flow chart illustrating an example method for motion adaptive encoding of video frames.

FIG. 2 is a flow chart illustrating a method for motion adaptive encoding of video frames. The example method 200 can be implemented in the system 100 of FIG. 1, the computing device 400 of FIG. 4, or the computer readable media 500 of FIG. 5.

At block 202, a processor receives a current frame to be encoded, and a quantization parameter and statistics for the current frame. For example, the current frame may be a B frame.

At block 204, the processor detects a motion activity status for the current frame based on the statistics via a motion activity analysis. For example, the motion activity analysis may include a look ahead analysis. In various examples, the look ahead analysis may include down-sampling input pictures and encoding the down-sampled pictures with constant QPs. The look ahead analysis may also include dividing each picture into evenly divided regions and calculating the total number of macroblocks that use zero motion vectors in each region. In some examples, the motion activity analysis may not include a look ahead analysis. For example, if no look ahead analysis is included, then motion vector statistics of a previously encoded reference frame may be used. In various examples, a macroblock may be counted only if the macroblock has zero motion vector and one of its eight neighbors has zero motion vector.

At block 206, the processor adaptively switches between a regular reference list management and a long-term reference frame insertion based on the detected motion activity status and the quantization parameter. In various examples, the processor may adaptively switch between regular reference list management and a long-term reference frame insertion based on the quantization parameter exceeding or not exceeding a threshold value, and based on whether the detected motion activity status is static, universal motion, or global motion. For example, the processor can adaptively switch between regular reference list management and a long-term reference frame insertion using the method 300 of FIG. 3.

At block 208, the processor encodes the current frame using the regular reference list management or the long-term reference frame insertion. For example, in regular reference list management, the processor can apply normal zero-enforcing to the spatial direct and skip mode motion vectors if the co-located reference block is stationary. In long-term reference frame insertion, all frames in a reference picture list may be set as long-term references, and thus zero-enforcing may be avoided on spatial direct and skip mode motion vectors.

This process flow diagram is not intended to indicate that the blocks of the example method 200 are to be executed in any particular order, or that all of the blocks are to be included in every case. Further, any number of additional blocks not shown may be included within the example method 200, depending on the details of the specific implementation.

Figure 3:
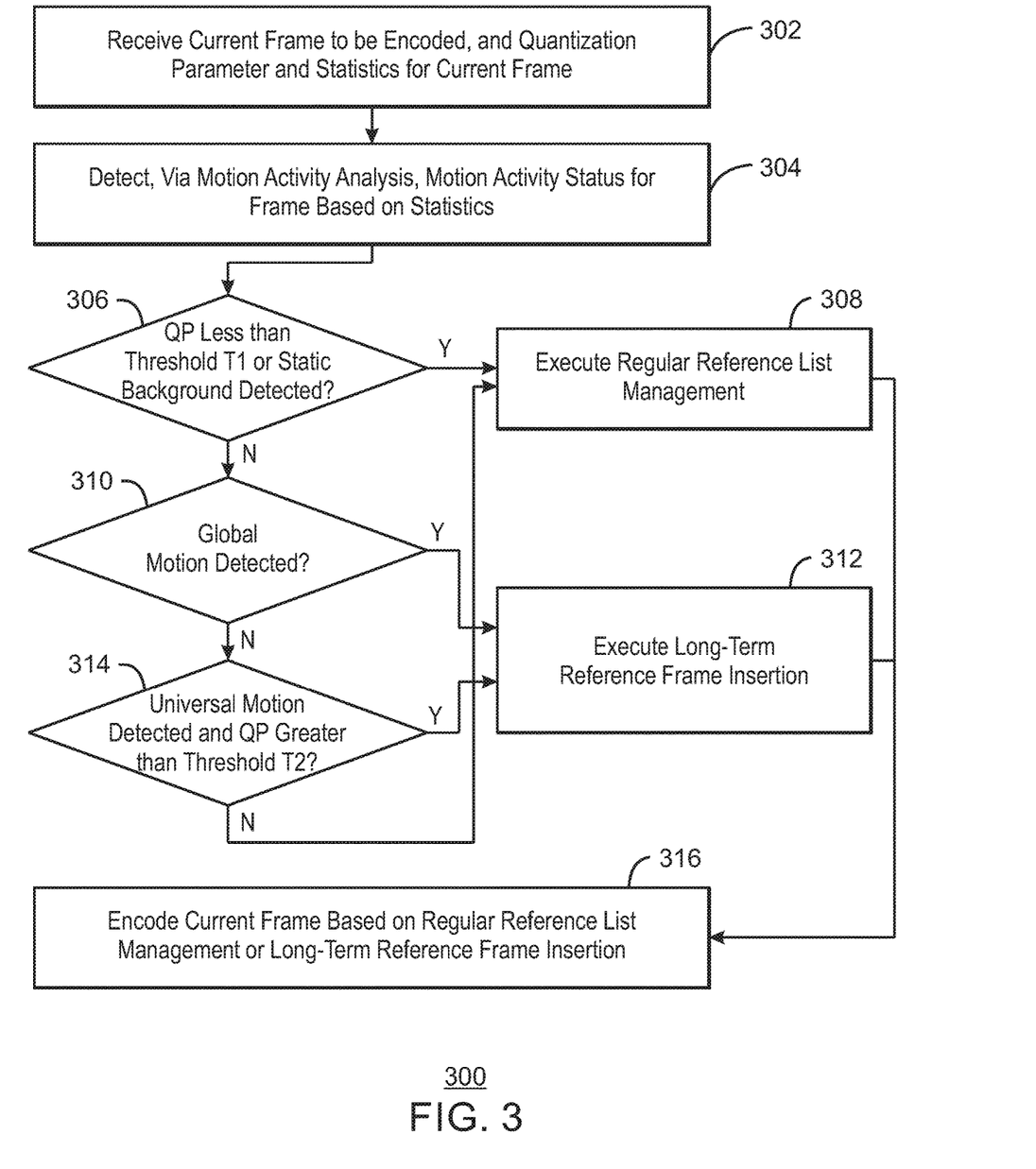
FIG. 3 is a flow chart illustrating another example method for motion adaptive encoding of video frames.

FIG. 3 is a flow chart illustrating another method for motion adaptive encoding of video frames. The example method 300 can be implemented in the system 100 of FIG. 1, the computing device 400 of FIG. 4, or the computer readable media 500 of FIG. 5.

At block 302, a processor receives a current frame to be encoded, and a quantization parameter and statistics for the current frame. For example, the current frame may be a B frame.

At block 304, the processor detects a motion activity status for the current frame based on the statistics via a motion activity analysis. For example, the motion activity analysis may include a look ahead analysis. In various examples, the look ahead analysis may include down-sampling input pictures and encoding the down-sampled pictures with constant QPs. The look ahead analysis may also include dividing each picture into evenly divided regions and calculating the total number of macroblocks that use zero motion vectors in each region. In some examples, the motion activity analysis may not include a look ahead analysis. For example, if no look ahead analysis is included, then motion vector statistics of a previously encoded reference frame may be used. In various examples, a macroblock may be counted only if the macroblock has zero motion vector and one of its eight neighbors has zero motion vector.

At decision diamond 306, the processor determines whether the quantization parameter (QP) is less than a first threshold (T1) or a static background is detected. For example, the static background may be detected if the processor determines that a threshold area of static content is exceeded in the frame. If the QP is less than the first threshold T1 or the static background is detected, then the method continues at block 308. If the quantization parameter (QP) is not less than a first threshold (T1) and a static background is not detected, then the method continues at decision diamond 310.

At block 308, the processor executes a regular reference list management. In various examples, the method may then continue at block 316.

At decision diamond 310, the processor determines whether a global motion is detected. If the processor detects the global motion, then the method continues at block 312. If the processor does not detect the global motion, then the method continues at decision diamond 314.

At block 312, the processor executes a long-term reference frame insertion. In various examples, the method may then continue at block 316.

At decision diamond 314, the processor determines whether a universal motion or the QP is greater than a second threshold (T2). If the processor does not detect the universal motion or that the QP is not greater than the second threshold T2, then the method continues at block 308. If the processor detects the universal motion and that the QP is greater than the second threshold T2, the method continues at 312.

At block 316, the processor encodes the current frame based on the regular reference list management or the long-term reference frame insertion. For example, in the regular reference list management, the processor can apply normal zero-enforcing to the spatial direct and skip mode motion vectors if the co-located reference block is stationary. In the long-term reference frame insertion, all frames in a reference picture list may be set as long-term references, and thus zero-enforcing may be avoided on spatial direct and skip mode motion vectors.

This process flow diagram is not intended to indicate that the blocks of the example method 300 are to be executed in any particular order, or that all of the blocks are to be included in every case. Further, any number of additional blocks not shown may be included within the example method 300, depending on the details of the specific implementation.

Figure 4:
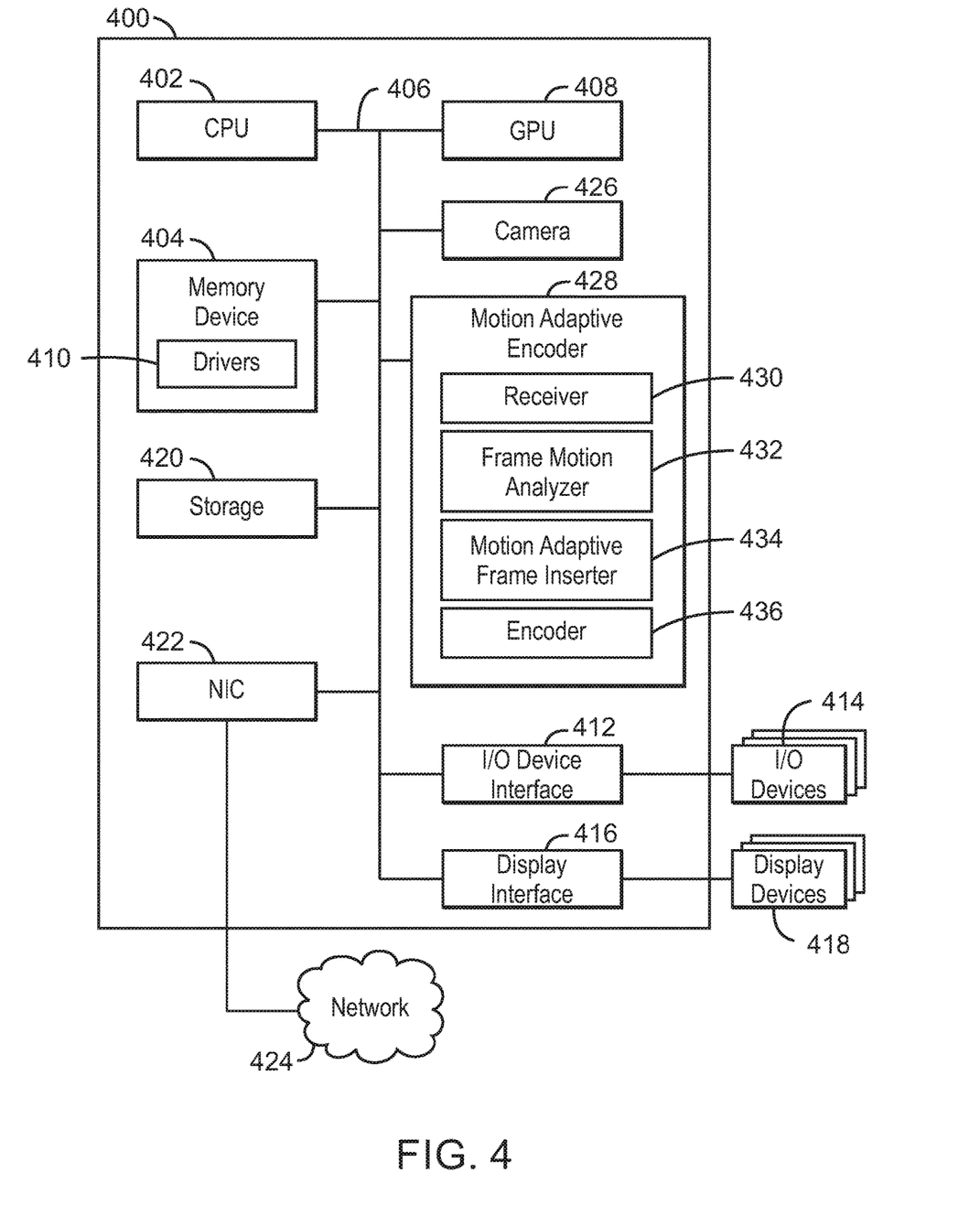
FIG. 4 is block diagram illustrating an example computing device that can adaptively encode video frames based on motion.

Referring now to FIG. 4, a block diagram is shown illustrating an example computing device that can adaptively encode video frames based on motion. The computing device 400 may be, for example, a laptop computer, desktop computer, tablet computer, mobile device, or wearable device, among others. In some examples, the computing device 400 may be a streaming video capture device, such as a security camera or other camera. The computing device 400 may include a central processing unit (CPU) 402 that is configured to execute stored instructions, as well as a memory device 404 that stores instructions that are executable by the CPU 402. The CPU 402 may be coupled to the memory device 404 by a bus 406. Additionally, the CPU 402 can be a single core processor, a multi-core processor, a computing cluster, or any number of other configurations. Furthermore, the computing device 400 may include more than one CPU 402. In some examples, the CPU 402 may be a system-on-chip (SoC) with a multi-core processor architecture. In some examples, the CPU 402 can be a specialized digital signal processor (DSP) used for image processing. The memory device 404 can include random access memory (RAM), read only memory (ROM), flash memory, or any other suitable memory systems. For example, the memory device 404 may include dynamic random access memory (DRAM).

The memory device 404 can include random access memory (RAM), read only memory (ROM), flash memory, or any other suitable memory systems. For example, the memory device 404 may include dynamic random access memory (DRAM).

The computing device 400 may also include a graphics processing unit (GPU) 408. As shown, the CPU 402 may be coupled through the bus 406 to the GPU 408. The GPU 408 may be configured to perform any number of graphics operations within the computing device 400. For example, the GPU 408 may be configured to render or manipulate graphics images, graphics frames, videos, or the like, to be displayed to a user of the computing device 400.

The memory device 404 can include random access memory (RAM), read only memory (ROM), flash memory, or any other suitable memory systems. For example, the memory device 404 may include dynamic random access memory (DRAM). The memory device 404 may include device drivers 410 that are configured to execute the instructions for training multiple convolutional neural networks to perform sequence independent processing. The device drivers 410 may be software, an application program, application code, or the like.

The CPU 402 may also be connected through the bus 406 to an input/output (I/O) device interface 412 configured to connect the computing device 400 to one or more I/O devices 414. The I/O devices 414 may include, for example, a keyboard and a pointing device, wherein the pointing device may include a touchpad or a touchscreen, among others. The I/O devices 414 may be built-in components of the computing device 400, or may be devices that are externally connected to the computing device 400. In some examples, the memory 404 may be communicatively coupled to I/O devices 414 through direct memory access (DMA).

The CPU 402 may also be linked through the bus 406 to a display interface 416 configured to connect the computing device 400 to a display device 418. The display device 418 may include a display screen that is a built-in component of the computing device 400. The display device 418 may also include a computer monitor, television, or projector, among others, that is internal to or externally connected to the computing device 400.

The computing device 400 also includes a storage device 420. The storage device 420 is a physical memory such as a hard drive, an optical drive, a thumbdrive, an array of drives, a solid-state drive, or any combinations thereof. The storage device 420 may also include remote storage drives.

The computing device 400 may also include a network interface controller (NIC) 422. The NIC 422 may be configured to connect the computing device 400 through the bus 406 to a network 424. The network 424 may be a wide area network (WAN), local area network (LAN), or the Internet, among others. In some examples, the device may communicate with other devices through a wireless technology. For example, the device may communicate with other devices via a wireless local area network connection. In some examples, the device may connect and communicate with other devices via Bluetooth® or similar technology.

The computing device 400 further includes a camera 426. For example, the camera 426 may include one or more imaging sensors. In some example, the camera 426 may include a processor to generate video frames.

The computing device 400 further includes a motion adaptive encoder 428. For example, the motion adaptive encoder 428 can be used to adaptively encode video frames based on detected motion. The motion adaptive encoder 428 can include a receiver 430, a frame motion analyzer 432, a motion adaptive frame inserter 434, and an encoder 436. In some examples, each of the components 430-436 of the motion adaptive encoder 428 may be a microcontroller, embedded processor, or software module. The receiver 430 can receive a current frame to be encoded, and a quantization parameter and statistics for the current frame. For example, the current frame may be a B frame. The frame motion analyzer 432 can detect a motion activity status for the current frame based on the statistics via a motion activity analysis. In some examples, the frame motion analyzer 432 can execute the look ahead analysis before encoding is executed. In various examples, the frame motion analyzer 432 can execute the motion activity analysis on each reference frame before encoding of associated B frames. The motion adaptive frame inserter 434 can adaptively switch between a regular reference list management and a long-term reference frame insertion based on the detected motion activity status and the quantization parameter. For example, the long-term reference frame insertion may include setting all reference frames in a reference picture list as long term. In various examples, the motion adaptive frame inserter 434 can execute the regular reference list management in response to detecting that the quantization parameter is less than a first threshold or that the frame includes a static background. In some examples, the motion adaptive frame inserter 434 can execute the long-term reference frame insertion in response to detecting that the frame includes a global motion. In various examples, the motion adaptive frame inserter 434 can execute the long-term reference frame insertion in response to detecting that the frame includes a universal motion and that the quantization parameter is greater than a second threshold. In some examples, the motion adaptive frame inserter 434 can execute the regular reference list management in response to detecting that the frame does not include a universal motion or that the quantization parameter is not greater than a second threshold. The encoder 436 can encode the current frame using the regular reference list management or the long-term reference frame insertion. In some examples, the encoder 436 can avoid zero-enforcing for a spatial direct mode vector or a skip mode motion vector in response to detecting the long-term reference frame insertion.

The block diagram of FIG. 4 is not intended to indicate that the computing device 400 is to include all of the components shown in FIG. 4. Rather, the computing device 400 can include fewer or additional components not illustrated in FIG. 4, such as additional buffers, additional processors, and the like. The computing device 400 may include any number of additional components not shown in FIG. 4, depending on the details of the specific implementation. Furthermore, any of the functionalities of the receiver 430, the frame motion analyzer 432, the motion adaptive frame inserter 434, and the encoder 436, may be partially, or entirely, implemented in hardware and/or in the processor 402. For example, the functionality may be implemented with an application specific integrated circuit, in logic implemented in the processor 402, or in any other device. In addition, any of the functionalities of the CPU 402 may be partially, or entirely, implemented in hardware and/or in a processor. For example, the functionality of the motion adaptive encoder 428 may be implemented with an application specific integrated circuit, in logic implemented in a processor, in logic implemented in a specialized graphics processing unit such as the GPU 408, or in any other device.

Figure 5:
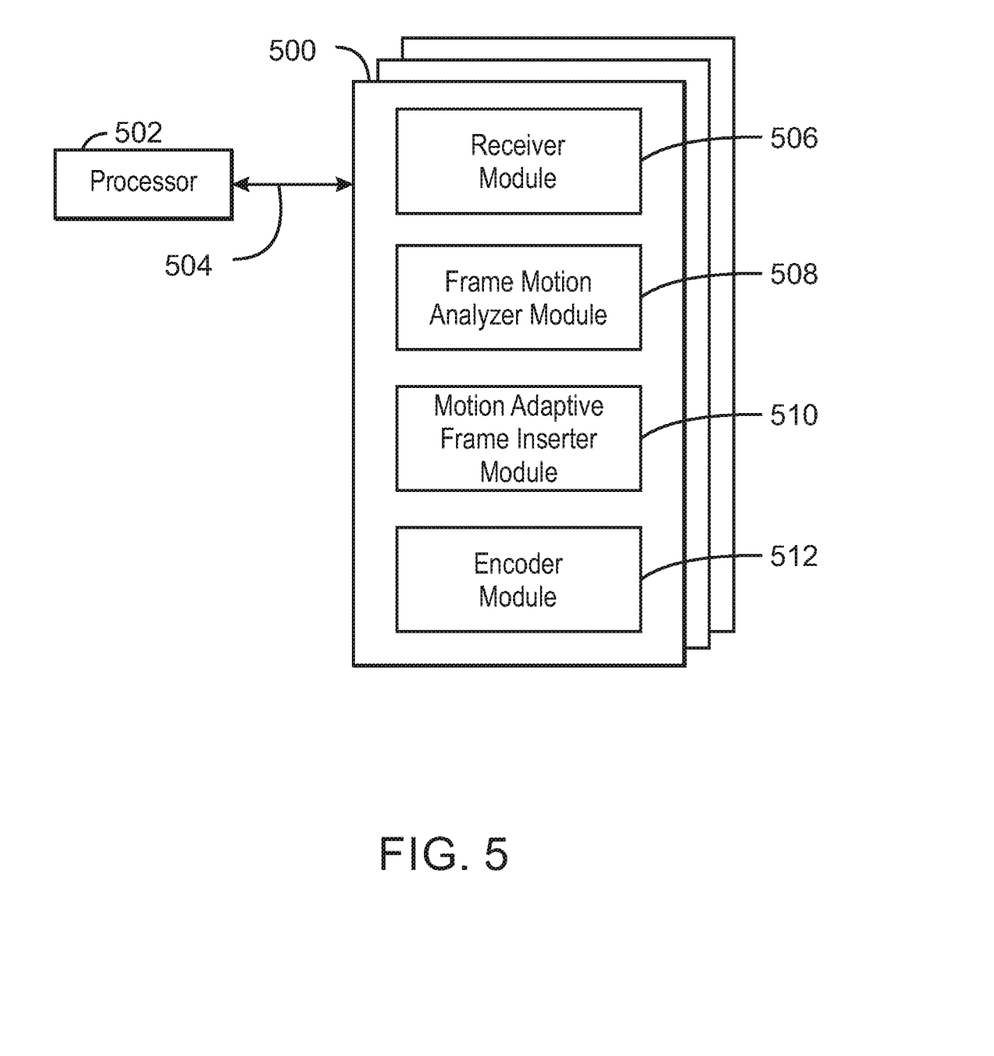
FIG. 5 is a block diagram showing computer readable media that store code for motion adaptive encoding of video frames.

FIG. 5 is a block diagram showing computer readable media 500 that store code for motion adaptive encoding of video frames. The computer readable media 500 may be accessed by a processor 502 over a computer bus 504. Furthermore, the computer readable medium 500 may include code configured to direct the processor 502 to perform the methods described herein. In some embodiments, the computer readable media 500 may be non-transitory computer readable media. In some examples, the computer readable media 500 may be storage media.

The various software components discussed herein may be stored on one or more computer readable media 500, as indicated in FIG. 5. For example, a receiver module 506 may be configured to receive a current frame to be encoded, and a quantization parameter and statistics for the current frame. For example, the current frame may be a B frame. A frame motion analyzer module 508 may be configured to detect a motion activity status for the current frame based on the statistics via a motion activity analysis. In some examples, the frame motion analyzer module 508 may be configured to execute a look ahead analysis before encoding is executed. In various examples, the frame motion analyzer module 508 may be configured to execute the motion activity analysis on each reference frame before encoding of associated B frames. A motion adaptive frame inserter module 510 may be configured to adaptively switch between a regular reference list management and a long-term reference frame insertion based on the detected motion activity status and the quantization parameter. For example, the regular reference list management may include applying normal zero-enforcing to the spatial direct and skip mode motion vectors if the co-located reference block is stationary. In some examples, the long-term reference frame insertion may include instructions to set all reference frames in a reference picture list as long term. In some examples, the motion adaptive frame inserter module 510 may be configured to execute the regular reference list management in response to detecting that the quantization parameter is less than a first threshold or that the frame includes a static background. In various examples, the motion adaptive frame inserter module 510 may be configured to execute the long-term reference frame insertion in response to detecting that the frame includes a global motion. In some examples, the motion adaptive frame inserter module 510 may be configured to execute the long-term reference frame insertion in response to detecting that the frame includes a universal motion and that the quantization parameter is greater than a second threshold. In various examples, the motion adaptive frame inserter module 510 may be configured to execute the regular reference list management in response to detecting that the frame does not include a universal motion or that the quantization parameter is not greater than a second threshold. An encoder module 512 may be configured to encode the current frame using the regular reference list management or the long-term reference frame insertion. In some examples, the encoder module 512 may be configured to avoid zero-enforcing for a spatial direct mode vector or a skip mode motion vector in response to detecting the long-term reference frame insertion.

The block diagram of FIG. 5 is not intended to indicate that the computer readable media 500 is to include all of the components shown in FIG. 5. Further, the computer readable media 500 may include any number of additional components not shown in FIG. 5, depending on the details of the specific implementation.

EXAMPLES

Example 1 is an apparatus for encoding video frames. The apparatus includes a receiver to receive a current frame to be encoded, and a quantization parameter and statistics for the current frame. The apparatus also includes a frame motion analyzer to detect a motion activity status for the current frame based on the statistics via a motion activity analysis. The apparatus further includes a motion adaptive frame inserter to adaptively switch between a regular reference list management and a long-term reference frame insertion based on the detected motion activity status and the quantization parameter. The apparatus also further includes an encoder to encode the current frame using the regular reference list management or the long-term reference frame insertion.

Example 2 includes the apparatus of example 1, including or excluding optional features. In this example, the motion adaptive frame inserter is to execute the regular reference list management in response to detecting that the quantization parameter is less than a first threshold or that the current frame includes a static background.

Example 3 includes the apparatus of any one of examples 1 to 2, including or excluding optional features. In this example, the motion adaptive frame inserter is to execute the long-term reference frame insertion in response to detecting that the frame includes a global motion.

Example 4 includes the apparatus of any one of examples 1 to 3, including or excluding optional features. In this example, the motion adaptive frame inserter is to execute the long-term reference frame insertion in response to detecting that the frame includes a universal motion and that the quantization parameter is greater than a second threshold.

Example 5 includes the apparatus of any one of examples 1 to 4, including or excluding optional features. In this example, the motion adaptive frame inserter is to execute the regular reference list management in response to detecting that the frame does not include a universal motion or that the quantization parameter is not greater than a second threshold.

Example 6 includes the apparatus of any one of examples 1 to 5, including or excluding optional features. In this example, the motion activity analysis includes a look ahead analysis executed before encoding is executed.

Example 7 includes the apparatus of any one of examples 1 to 6, including or excluding optional features. In this example, the motion activity analysis is executed on each reference frame before encoding of associated B frames.

Example 8 includes the apparatus of any one of examples 1 to 7, including or excluding optional features. In this example, the long-term reference frame insertion includes setting all reference frames in a reference picture list as long term.

Example 9 includes the apparatus of any one of examples 1 to 8, including or excluding optional features. In this example, the encoder is to avoid zero-enforcing for a spatial direct mode vector or a skip mode motion vector in response to detecting the long-term reference frame insertion.

Example 10 includes the apparatus of any one of examples 1 to 9, including or excluding optional features. In this example, the current frame includes a B frame.

Example 11 is a method for encoding video frames. The method includes receiving, via a processor, a current frame to be encoded, and a quantization parameter and statistics for the current frame. The method also includes detecting, via the processor, a motion activity status for the current frame based on the statistics via a motion activity analysis. The method also further includes adaptively switching, via the processor, between a regular reference list management and a long-term reference frame insertion based on the detected motion activity status and the quantization parameter. The method also includes encoding, via the processor, the current frame using the regular reference list management or the long-term reference frame insertion.

Example 12 includes the method of example 11, including or excluding optional features. In this example, adaptively switching between the regular reference list management and the long-term reference frame insertion includes executing the regular reference list management in response to detecting that the quantization parameter is less than a first threshold or that the frame includes a static background.

Example 13 includes the method of any one of examples 11 to 12, including or excluding optional features. In this example, adaptively switching between the regular reference list management and the long-term reference frame insertion includes executing the long-term reference frame insertion in response to detecting that the frame includes a global motion.

Example 14 includes the method of any one of examples 11 to 13, including or excluding optional features. In this example, adaptively switching between the regular reference list management and the long-term reference frame insertion includes executing the long-term reference frame insertion in response to detecting that the frame includes a universal motion and that the quantization parameter is greater than a second threshold.

Example 15 includes the method of any one of examples 11 to 14, including or excluding optional features. In this example, adaptively switching between the regular reference list management and the long-term reference frame insertion includes executing the regular reference list management in response to detecting that the frame does not include a universal motion or that the quantization parameter is not greater than a second threshold.

Example 16 includes the method of any one of examples 11 to 15, including or excluding optional features. In this example, the method includes executing the motion activity analysis using a look ahead analysis executed before encoding is executed.

Example 17 includes the method of any one of examples 11 to 16, including or excluding optional features. In this example, the method includes executing the motion activity analysis on each reference frame before encoding of associated B frames.

Example 18 includes the method of any one of examples 11 to 17, including or excluding optional features. In this example, the long-term reference frame insertion includes setting all reference frames in a reference picture list as long term.

Example 19 includes the method of any one of examples 11 to 18, including or excluding optional features. In this example, encoding the current frame includes avoiding zero-enforcing for a spatial direct mode vector or a skip mode motion vector in response to detecting the long-term reference frame insertion.

Example 20 includes the method of any one of examples 11 to 19, including or excluding optional features. In this example, the regular reference list management includes applying normal zero-enforcing to a spatial direct and skip mode motion vectors if a co-located reference block is stationary.

Example 21 is at least one computer readable medium for encoding video frames having instructions stored therein that direct the processor to receive a current frame to be encoded, and a quantization parameter and statistics for the current frame. The computer-readable medium also includes instructions that direct the processor to detect a motion activity status for the current frame based on the statistics via a motion activity analysis. The computer-readable medium further includes instructions that direct the processor to adaptively switch between a regular reference list management and a long-term reference frame insertion based on the detected motion activity status and the quantization parameter. The computer-readable medium also further includes instructions that direct the processor to encode the current frame using the regular reference list management or the long-term reference frame insertion.

Example 22 includes the computer-readable medium of example 21, including or excluding optional features. In this example, the computer-readable medium includes instructions to execute the regular reference list management in response to detecting that the quantization parameter is less than a first threshold or that the frame includes a static background.

Example 23 includes the computer-readable medium of any one of examples 21 to 22, including or excluding optional features. In this example, the computer-readable medium includes instructions to execute the long-term reference frame insertion in response to detecting that the frame includes a global motion.

Example 24 includes the computer-readable medium of any one of examples 21 to 23, including or excluding optional features. In this example, the computer-readable medium includes instructions to execute the long-term reference frame insertion in response to detecting that the frame includes a universal motion and that the quantization parameter is greater than a second threshold.

Example 25 includes the computer-readable medium of any one of examples 21 to 24, including or excluding optional features. In this example, the computer-readable medium includes instructions to execute the regular reference list management in response to detecting that the frame does not include a universal motion or that the quantization parameter is not greater than a second threshold.

Example 26 includes the computer-readable medium of any one of examples 21 to 25, including or excluding optional features. In this example, the computer-readable medium includes instructions to execute the motion activity analysis using a look ahead analysis executed before encoding is executed.

Example 27 includes the computer-readable medium of any one of examples 21 to 26, including or excluding optional features. In this example, the computer-readable medium includes instructions to execute the motion activity analysis on each reference frame before encoding of associated B frames.

Example 28 includes the computer-readable medium of any one of examples 21 to 27, including or excluding optional features. In this example, the computer-readable medium includes instructions to set all reference frames in a reference picture list as long term.

Example 29 includes the computer-readable medium of any one of examples 21 to 28, including or excluding optional features. In this example, the computer-readable medium includes instructions to avoid zero-enforcing for a spatial direct mode vector or a skip mode motion vector in response to detecting the long-term reference frame insertion.

Example 30 includes the computer-readable medium of any one of examples 21 to 29, including or excluding optional features. In this example, the computer-readable medium includes instructions to apply normal zero-enforcing to a spatial direct and skip mode motion vectors if a co-located reference block is stationary.

Example 31 is a system for encoding video frames. The system includes a receiver to receive a current frame to be encoded, and a quantization parameter and statistics for the current frame. The system also includes a frame motion analyzer to detect a motion activity status for the current frame based on the statistics via a motion activity analysis. The system further includes a motion adaptive frame inserter to adaptively switch between a regular reference list management and a long-term reference frame insertion based on the detected motion activity status and the quantization parameter. The system also includes an encoder to encode the current frame using the regular reference list management or the long-term reference frame insertion.

Example 32 includes the system of example 31, including or excluding optional features. In this example, the motion adaptive frame inserter is to execute the regular reference list management in response to detecting that the quantization parameter is less than a first threshold or that the current frame includes a static background.

Example 33 includes the system of any one of examples 31 to 32, including or excluding optional features. In this example, the motion adaptive frame inserter is to execute the long-term reference frame insertion in response to detecting that the frame includes a global motion.

Example 34 includes the system of any one of examples 31 to 33, including or excluding optional features. In this example, the motion adaptive frame inserter is to execute the long-term reference frame insertion in response to detecting that the frame includes a universal motion and that the quantization parameter is greater than a second threshold.

Example 35 includes the system of any one of examples 31 to 34, including or excluding optional features. In this example, the motion adaptive frame inserter is to execute the regular reference list management in response to detecting that the frame does not include a universal motion or that the quantization parameter is not greater than a second threshold.

Example 36 includes the system of any one of examples 31 to 35, including or excluding optional features. In this example, the motion activity analysis includes a look ahead analysis executed before encoding is executed.

Example 37 includes the system of any one of examples 31 to 36, including or excluding optional features. In this example, the motion activity analysis is executed on each reference frame before encoding of associated B frames.

Example 38 includes the system of any one of examples 31 to 37, including or excluding optional features. In this example, the long-term reference frame insertion includes setting all reference frames in a reference picture list as long term.

Example 39 includes the system of any one of examples 31 to 38, including or excluding optional features. In this example, the encoder is to avoid zero-enforcing for a spatial direct mode vector or a skip mode motion vector in response to detecting the long-term reference frame insertion.

Example 40 includes the system of any one of examples 31 to 39, including or excluding optional features. In this example, the current frame includes a B frame.

Example 41 is a system for encoding video frames. The system includes means for receiving a current frame to be encoded, and a quantization parameter and statistics for the current frame. The system also includes means for detecting a motion activity status for the current frame based on the statistics via a motion activity analysis. The system further includes means for adaptively switching between a regular reference list management and a long-term reference frame insertion based on the detected motion activity status and the quantization parameter. The system also further includes means for encoding the current frame using the regular reference list management or the long-term reference frame insertion.

Example 42 includes the system of example 41, including or excluding optional features. In this example, the means for adaptively switching between the regular reference list management and the long-term reference frame insertion is to execute the regular reference list management in response to detecting that the quantization parameter is less than a first threshold or that the current frame includes a static background.

Example 43 includes the system of any one of examples 41 to 42, including or excluding optional features. In this example, the means for adaptively switching between the regular reference list management and the long-term reference frame insertion is to execute the long-term reference frame insertion in response to detecting that the frame includes a global motion.

Example 44 includes the system of any one of examples 41 to 43, including or excluding optional features. In this example, the means for adaptively switching between the regular reference list management and the long-term reference frame insertion is to execute the long-term reference frame insertion in response to detecting that the frame includes a universal motion and that the quantization parameter is greater than a second threshold.

Example 45 includes the system of any one of examples 41 to 44, including or excluding optional features. In this example, the means for adaptively switching between the regular reference list management and the long-term reference frame insertion is to execute the regular reference list management in response to detecting that the frame does not include a universal motion or that the quantization parameter is not greater than a second threshold.

Example 46 includes the system of any one of examples 41 to 45, including or excluding optional features. In this example, the motion activity analysis includes a look ahead analysis executed before encoding is executed.

Example 47 includes the system of any one of examples 41 to 46, including or excluding optional features. In this example, the motion activity analysis is executed on each reference frame before encoding of associated B frames.

Example 48 includes the system of any one of examples 41 to 47, including or excluding optional features. In this example, the long-term reference frame insertion includes setting all reference frames in a reference picture list as long term.

Example 49 includes the system of any one of examples 41 to 48, including or excluding optional features. In this example, the means for encoding the current frame is to avoid zero-enforcing for a spatial direct mode vector or a skip mode motion vector in response to detecting the long-term reference frame insertion.

Example 50 includes the system of any one of examples 41 to 49, including or excluding optional features. In this example, the current frame includes a B frame.

Not all components, features, structures, characteristics, etc. described and illustrated herein need be included in a particular aspect or aspects. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some aspects have been described in reference to particular implementations, other implementations are possible according to some aspects. Additionally, the arrangement and/or order of circuit elements or other features illustrated in the drawings and/or described herein need not be arranged in the particular way illustrated and described. Many other arrangements are possible according to some aspects.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more aspects. For instance, all optional features of the computing device described above may also be implemented with respect to either of the methods or the computer-readable medium described herein. Furthermore, although flow diagrams and/or state diagrams may have been used herein to describe aspects, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An apparatus for encoding video frames, the apparatus comprising:
   a receiver to receive a frame to be encoded, and to receive a quantization parameter and statistics for the frame;
   a frame motion analyzer to detect a motion activity status for the frame based on the statistics;
   a motion adaptive frame inserter to adaptively switch between execution of regular reference list management and execution of long-term reference frame insertion based on the detected motion activity status and the quantization parameter, the motion adaptive frame inserter to execute the long-term reference frame insertion in response to the frame including a universal motion and the quantization parameter being greater than a threshold; and
   an encoder to encode the frame using the regular reference list management or the long-term reference frame insertion.

2. The apparatus of claim 1, wherein the threshold is a second threshold, and the motion adaptive frame inserter is to execute the regular reference list management in response to the quantization parameter being less than a first threshold or the frame including a static background.

3. The apparatus of claim 1, wherein the motion adaptive frame inserter is to execute the long-term reference frame insertion in response to the frame including a global motion.

4. An apparatus for encoding video frames, the apparatus comprising:
   a receiver to receive a frame to be encoded, and to receive a quantization parameter and statistics for the frame;
   a frame motion analyzer to detect a motion activity status for the frame based on the statistics;
   a motion adaptive frame inserter to adaptively switch between execution of regular reference list management and execution of long-term reference frame insertion based on the detected motion activity status and the quantization parameter, the motion adaptive frame inserter to execute the regular reference list management in response to the frame not including a universal motion or the quantization parameter not being greater than a threshold; and
   an encoder to encode the frame using the regular reference list management or the long-term reference frame insertion.

5. The apparatus of claim 1, wherein the frame motion analyzer is to detect the motion activity status based on a look ahead analysis executed before encoding is executed.

6. The apparatus of claim 1, wherein the frame motion analyzer is to detect the motion activity status based on a motion activity analysis executed on each reference frame before encoding of associated B frames.

7. The apparatus of claim 1, wherein the long-term reference frame insertion is to set all reference frames in a reference picture list as long term.

8. An apparatus for encoding video frames, the apparatus comprising:
a receiver to receive a frame to be encoded, and to receive a quantization parameter and statistics for the frame;
a frame motion analyzer to detect a motion activity status for the frame based on the statistics;
a motion adaptive frame inserter to adaptively switch between execution of regular reference list management and execution of long-term reference frame insertion based on the detected motion activity status and the quantization parameter; and
an encoder to encode the frame using the regular reference list management or the long-term reference frame insertion, the encoder to avoid zero-enforcing for a spatial direct mode vector or a skip mode motion vector in response to detecting use of the long-term reference frame insertion.

9. The apparatus of claim 1, wherein the frame is a B frame.

10. A method for encoding video frames, the method comprising:
receiving, a frame to be encoded, and receiving a quantization parameter and statistics for the frame;
detecting, by executing an instruction with at least one processor, a motion activity status for the frame based on the statistics;
adaptively switching, by executing an instruction with the at least one processor, between execution of regular reference list management and execution of long-term reference frame insertion based on the detected motion activity status and the quantization parameter, the adaptively switching between execution of the regular reference list management and execution of the long-term reference frame insertion including executing the long-term reference frame insertion in response to the frame including a universal motion and the quantization parameter being greater than a threshold; and
encoding, by executing an instruction with the at least one processor, the frame using the regular reference list management or the long-term reference frame insertion.

11. The method of claim 10, wherein the threshold is a second threshold, and the adaptively switching between execution of the regular reference list management and execution of the long-term reference frame insertion includes executing the regular reference list management in response to the quantization parameter being less than a first threshold or the frame including a static background.

12. The method of claim 10, wherein the adaptively switching between execution of the regular reference list management and execution of the long-term reference frame insertion includes executing the long-term reference frame insertion in response to the frame including a global motion.

13. A method for encoding video frames, the method comprising:
receiving a frame to be encoded, and receiving a quantization parameter and statistics for the frame;
detecting, by executing an instruction with at least one processor, a motion activity status for the frame based on the statistics;
adaptively switching, by executing an instruction with the at least one processor, between execution of regular reference list management and execution of long-term reference frame insertion based on the detected motion activity status and the quantization parameter, the adaptively switching between execution of the regular reference list management and execution of the long-term reference frame insertion including executing the regular reference list management in response to the frame not including a universal motion or the quantization parameter not being greater than a threshold; and
encoding, by executing an instruction with the at least one processor, the frame using the regular reference list management or the long-term reference frame insertion.

14. The method of claim 10, wherein the detecting of the motion activity status is based on a look ahead analysis executed before encoding is executed.

15. The method of claim 10, wherein the detecting of the motion activity status is based on executing a motion activity analysis on each reference frame before encoding of associated B frames.

16. The method of claim 10, wherein the long-term reference frame insertion includes setting all reference frames in a reference picture list as long term.

17. A method for encoding video frames, the method comprising:
receiving a frame to be encoded, and receiving a quantization parameter and statistics for the frame;
detecting, by executing an instruction with at least one processor, a motion activity status for the frame based on the statistics;
adaptively switching, by executing an instruction with the at least one processor, between execution of regular reference list management and execution of long-term reference frame insertion based on the detected motion activity status and the quantization parameter; and
encoding, by executing an instruction with the at least one processor, the frame using the regular reference list management or the long-term reference frame insertion, the encoding of the frame including avoiding zero-enforcing for a spatial direct mode vector or a skip mode motion vector in response to using the long-term reference frame insertion.

18. A method for encoding video frames, the method comprising:
receiving a frame to be encoded, and receiving a quantization parameter and statistics for the frame;
detecting, by executing an instruction with at least one processor, a motion activity status for the frame based on the statistics;
adaptively switching, by executing an instruction with the at least one processor, between execution of regular reference list management and execution of long-term reference frame insertion based on the detected motion activity status and the quantization parameter; and
encoding, by executing an instruction with the at least one processor, the frame using the regular reference list management or the long-term reference frame insertion, the regular reference list management including applying normal zero-enforcing to spatial direct and skip mode motion vectors if a co-located reference block is stationary.

19. At least one computer readable medium comprising computer readable instructions that, when executed, cause a computing device to at least:
 receive a frame to be encoded, and receive a quantization parameter and statistics for the frame;
 detect a motion activity status for the frame based on the statistics;
 adaptively switch between execution of regular reference list management and execution of long-term reference frame insertion based on the detected motion activity status and the quantization parameter, the instructions to cause the computing device to execute the long-term reference frame insertion in response to the frame including a universal motion and the quantization parameter being greater than a threshold; and
 encode the frame using the regular reference list management or the long-term reference frame insertion.

20. The at least one computer readable medium of claim 19, wherein the threshold is a second threshold, and the instructions cause the computing device to execute the regular reference list management in response to the quantization parameter being less than a first threshold or the frame including a static background.

21. The at least one computer readable medium of claim 19, wherein the instructions cause the computing device to execute the long-term reference frame insertion in response to the frame including a global motion.

22. At least one computer readable medium comprising computer readable instructions that, when executed, cause a computing device to at least:
 receive a frame to be encoded, and receive a quantization parameter and statistics for the frame;
 detect a motion activity status for the frame based on the statistics;
 adaptively switch between execution of regular reference list management and execution of long-term reference frame insertion based on the detected motion activity status and the quantization parameter, wherein the instructions cause the computing device to execute the regular reference list management in response to the frame not including a universal motion or the quantization parameter not being greater than a threshold; and
 encode the frame using the regular reference list management or the long-term reference frame insertion.

* * * * *